US007124796B2

(12) United States Patent
Flynn et al.

(10) Patent No.: US 7,124,796 B2
(45) Date of Patent: Oct. 24, 2006

(54) LABEL ASSEMBLY AND APPARATUS

(76) Inventors: Timothy J. Flynn, 18 Caloosa Rd., Key Largo, FL (US) 33037; Thomas E. Flynn, 7305 Gleneagle Cir., Crystal Lake, IL (US) 60014; Patrick J. Flynn, 107 Jennifer St., Redlands, CA (US) 92373

( * ) Notice: Subject to any disclaimer, the term of this patent is extended or adjusted under 35 U.S.C. 154(b) by 15 days.

(21) Appl. No.: 10/713,550

(22) Filed: Nov. 14, 2003

(65) Prior Publication Data

US 2005/0103447 A1 May 19, 2005

(51) Int. Cl.
*B32B 37/00* (2006.01)
*B32B 39/00* (2006.01)
*B65C 9/26* (2006.01)

(52) U.S. Cl. ....................... 156/391; 156/556; 156/580

(58) Field of Classification Search ................ 156/391, 156/556, 580, DIG. 1, DIG. 2, DIG. 24, 156/DIG. 37
See application file for complete search history.

(56) References Cited

U.S. PATENT DOCUMENTS

| | | | | |
|---|---|---|---|---|
| 465,588 | A | 12/1891 | Wheeler | |
| 1,500,698 | A | 7/1924 | Wiehl | |
| 1,821,916 | A | 9/1931 | Acheson et al. | |
| 4,084,015 | A | 4/1978 | Patterson | |
| 5,334,432 | A | 8/1994 | Long | |
| 5,715,934 | A * | 2/1998 | Tobol et al. | 206/232 |
| 5,925,200 | A | 7/1999 | Grossman | |
| 6,054,009 | A | 4/2000 | Cote et al. | |
| 6,273,167 | B1 | 8/2001 | Miller | |
| 6,318,436 | B1 | 11/2001 | Hummell et al. | |
| 6,321,811 | B1 | 11/2001 | Atkinson et al. | |
| 6,347,654 | B1 | 2/2002 | Koch | |
| 6,363,987 | B1 | 4/2002 | Koch | |
| 6,405,777 | B1 | 6/2002 | Lebbad | |
| 6,408,918 | B1 | 6/2002 | Hummell et al. | |
| 6,431,238 | B1 | 8/2002 | Atkinson | |
| 6,508,914 | B1 * | 1/2003 | Schwaller et al. | 156/391 |
| 6,516,852 | B1 * | 2/2003 | Sandor | 156/391 |
| 6,543,508 | B1 * | 4/2003 | Koch | 156/391 |
| 6,585,021 | B1 * | 7/2003 | Clark et al. | 156/391 |
| 6,689,238 | B1 | 2/2004 | Barnet | |
| 6,748,994 | B1 * | 6/2004 | Wien et al. | 156/391 |

FOREIGN PATENT DOCUMENTS

| | | | |
|---|---|---|---|
| DE | 29800751 U1 | * | 6/1998 |
| WO | WO 200128866 A1 | * | 4/2001 |

* cited by examiner

*Primary Examiner*—Chris Fiorilla
*Assistant Examiner*—Sing Po Chan
(74) *Attorney, Agent, or Firm*—Pauley Petersen & Erickson

(57) ABSTRACT

An apparatus for transferring at least one label portion from a label assembly onto an object includes a base and a wall connected to the base. The wall forms opposing guides, which correspond to at least a portion of a periphery of the label assembly, and a stop wall. The opposing guides and the stop wall define an application area on a surface of the base. A first stripping member is connected with respect to a first end portion of the application area and suspended over at least a portion of the application area and a second stripping member is connected with respect to a second end portion of the application area and suspended over at least a portion of the application area. The label assembly is positionable on the base surface so that at least one label portion is positioned between the first stripping member and the second stripping member.

36 Claims, 6 Drawing Sheets

LABEL ASSEMBLY AND APPARATUS

BACKGROUND OF THE INVENTION

1. Field of the Invention

This invention is directed to an apparatus and method for applying and transferring a label portion from a label assembly to an object, such as a compact disc or a jewel case.

2. Description of Related Art

Labels such as those described herein can be used in connection with a wide variety of items, particularly, digital video discs (DVDs), compact discs (CDs), jewel cases and the like. It is desirable to have a label for adhering to items that will apply straight and direct to the object without misalignment, wrinkles, bubbles, folds or other errors inherent in the application of adhesive-backed labels onto items.

In addition, labels improperly affixed to objects, such as CDs, with adhesive can harm the discs if a user attempts to remove and/or straighten the labels. More specifically, damage may be caused by pulling off some of the disc protective coating, metal and dye along with the label. In addition, when a traditional label is peeled from its backing, the traditional label includes an inherent curling that may manifest itself a period of time later by peeling away from the object. This peel memory is problematic with tradition peel and stick labels and particularly destructive when used in connection with CDs that require high-speed, balanced rotation for proper operation.

Accordingly, a need exists for a new and improved apparatus and method for applying or transferring a label from a label assembly onto an object, such as a CD, a jewel case or a related object, in an accurate and positive fashion.

SUMMARY OF THE INVENTION

The present invention is direct to an apparatus and method for applying or transferring a label portion from a label assembly onto an object, such as a DVD, CD or a jewel case. The apparatus includes a base and a wall integrated with the base. At least a portion of the wall forms a stop wall. An application area is defined on a first surface of the base and is bounded at one end by the stop wall. Preferably, at least a portion of the wall further forms opposing guides, which correspond to at least a portion of a periphery of the label assembly. The opposing guides further bound and/or define the application area on the base surface. In one preferred embodiment of this invention, a first stripping member is positioned with respect to the application area. For example, at least one stripping finger is connected to or formed by the stop wall and extends from the stop wall to suspend over a first end portion of the application area. A gap is formed between each stripping finger and the base surface so that a portion of the label assembly can be positioned on the application surface and held or secured at least partially in place by the stripping fingers as the label portion is applied and transferred to the object at a desired location, such as a jewel case spine.

Preferably, a second stripping member is positioned with respect to the application area. For example, a stripping element extends with respect to a first guide of the opposing guides and is suspended over at least a portion of a second end portion of the application area. Preferably, the stripping element is spaced at a distance from the stripping fingers. A gap is formed between the stripping element and the base surface to allow the label assembly to be positioned on the application area. An opposing stripping element extends with respect to a second guide of the opposing guides at a distance from the stripping fingers and is suspended over at least a portion of the second end portion of the application area. A gap is formed between the opposing stripping element and the base surface to allow the label assembly to be positioned on the application area between the opposing guides.

In one preferred embodiment of this invention, the opposing stripping elements and the stripping fingers form or define a first guide area and a second guide area different than the first guide area, to position a portion of the jewel case for example, and to guide the jewel case portion into contact with one label portion on the label assembly positioned within the application area.

Preferably, a third guide is formed by at least a portion of the wall, which corresponds with at least a portion of the periphery of the label assembly and defines a second application area on the base surface. Preferably, at least one alignment member is connected to the third guide to properly position at least a portion of the label assembly within the third guide and the second application area. A first recessed area and a second recessed area are formed in the base surface and within the second application area. In order to efficiently utilize surface area within the second application area, a portion of the first recessed area may overlap a portion of the second recessed area. Further, a third recessed area may be positioned within the first recessed area or the second recessed area.

As a result of the configuration of the label assembly and/or the apparatus, the label portion is positioned on the application area so that the adhesive side of label portion faces upward from the base and exposed. The label portion is securely positioned between the first stripping member and the second stripping member. When an object, such as a jewel case, is positioned on the apparatus and the label assembly, the label portion is transferred in a desired manner onto the object.

In operation, the carrier portion of the label assembly remains on the apparatus following application of the label portion to the CD jewel case or other labeled object. Accordingly, the label portion is separated from the remaining label assembly, leaving the carrier portion in position on the apparatus. As a result, a second labeling operation may be used to transfer one or more additional label portions onto an object using the same label assembly. The additional label portion may include a spine label for application to a CD jewel case and/or any other suitable labels including traditional peel and stick labels.

It is an object of the present invention to provide an apparatus and method for applying a label portion of a label assembly onto an object, wherein the apparatus includes fixed stripping members to maintain a portion of the label assembly in a stationary and secured position between the stripping members as the label portion is transferred onto the object.

It is another object of the present invention to provide a label portion and/or label assembly suitable for labeling DVDs, CDs and jewel cases.

The foregoing and other features and advantages of the present invention will become further apparent from the following detailed description of presently preferred embodiments, read in conjunction with the accompanying drawings. The detailed description and drawings are intended to illustrate the present invention rather than limit the scope of the present invention as defined by the appended claims and equivalents of the appended claims.

BRIEF DESCRIPTION OF THE DRAWINGS

The present invention can be better understood with reference to the following drawings. In the drawings, like reference numerals designate corresponding parts throughout the several views. Moreover, it should be noted that the drawings are not necessarily to scale, emphasis instead being placed upon clearly illustrating principles of the present invention.

DETAILED DESCRIPTION OF PREFERRED EMBODIMENTS

Figure 1:
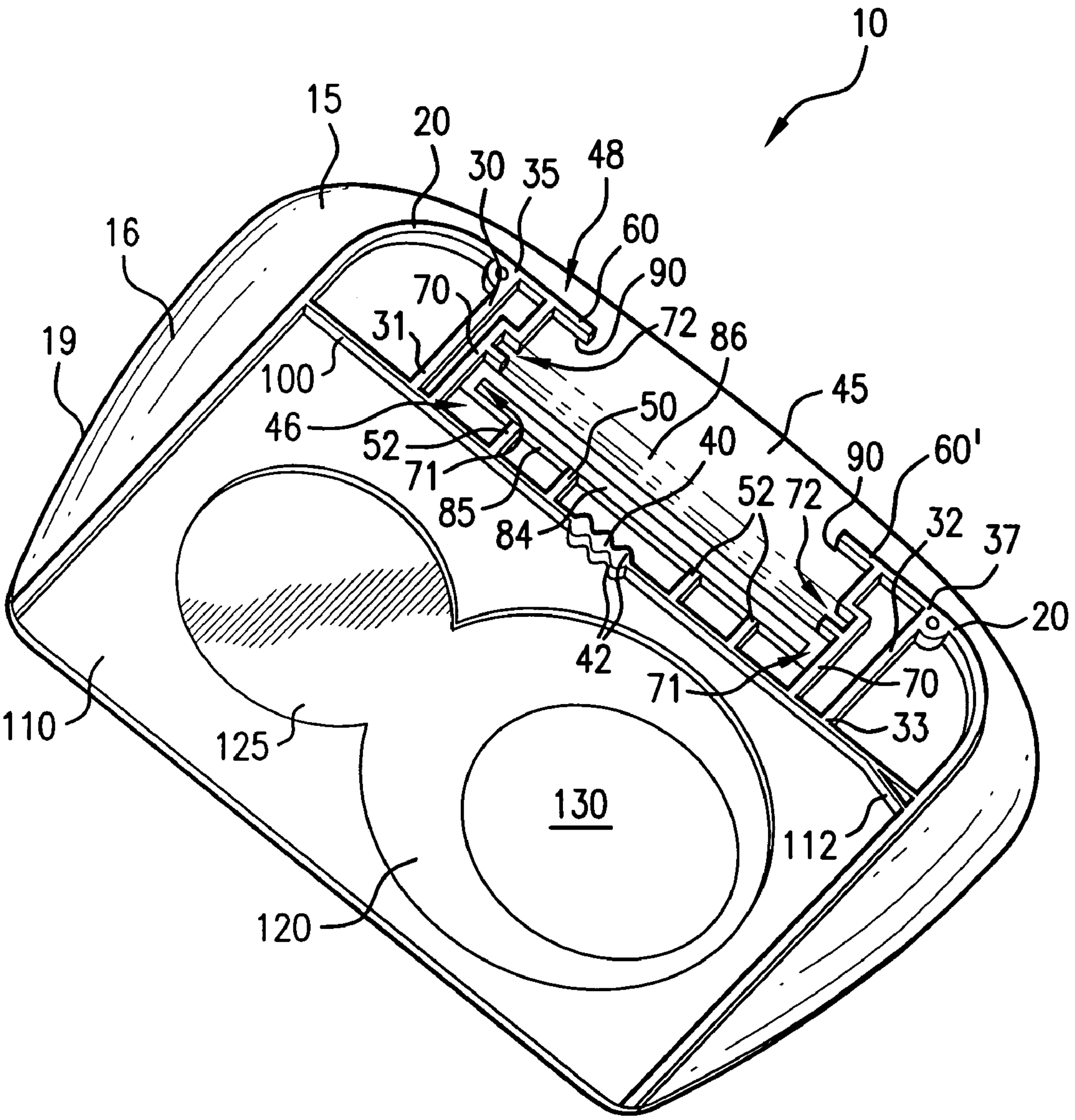
FIG. 1 illustrates a perspective first surface view of an apparatus for transferring at least one label portion from a label assembly onto an object, according to one preferred embodiment of this invention.
Figure 2:
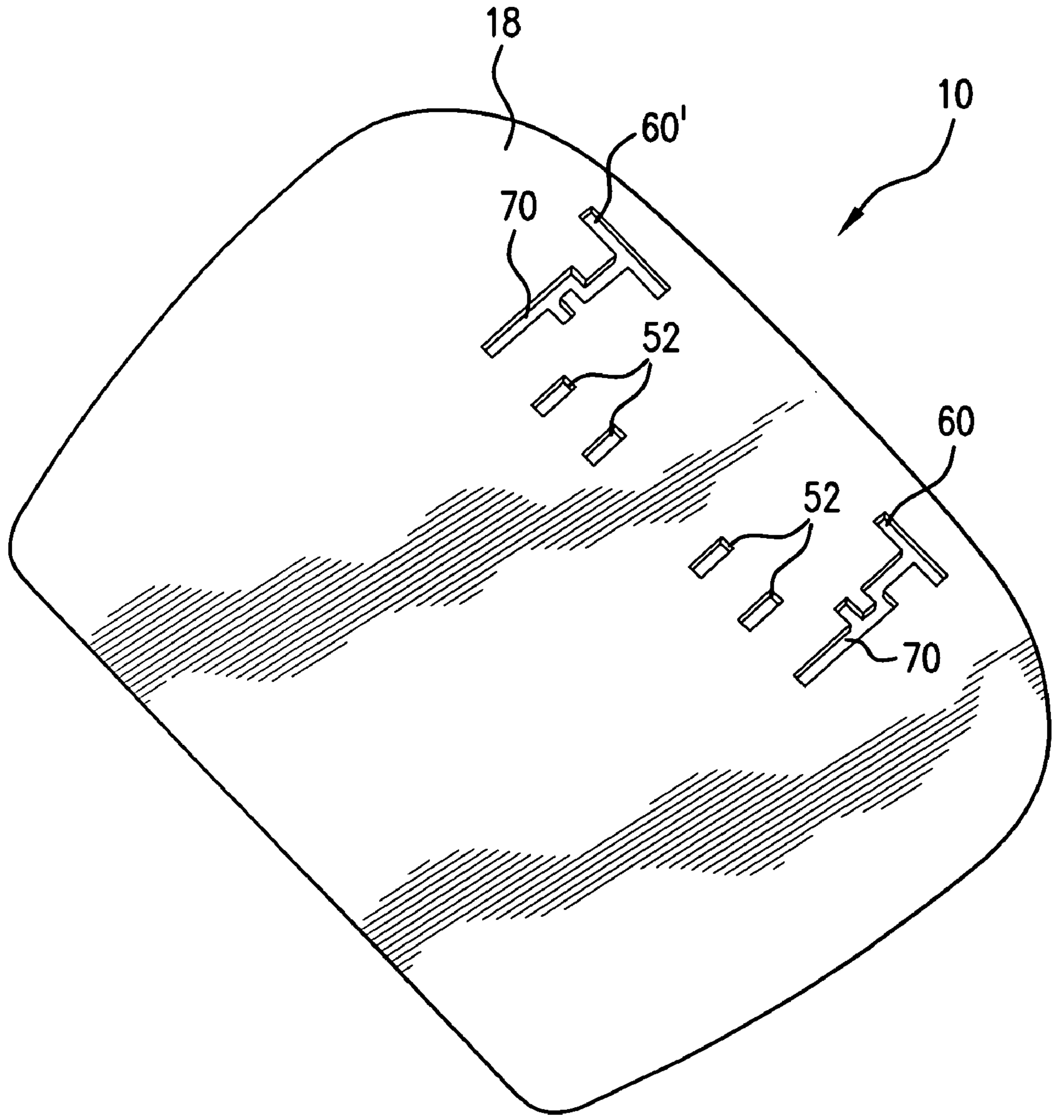
FIG. 2 illustrates a perspective opposing second surface view of the apparatus shown in FIG. 1, according to one preferred embodiment of this invention.
Figure 3:
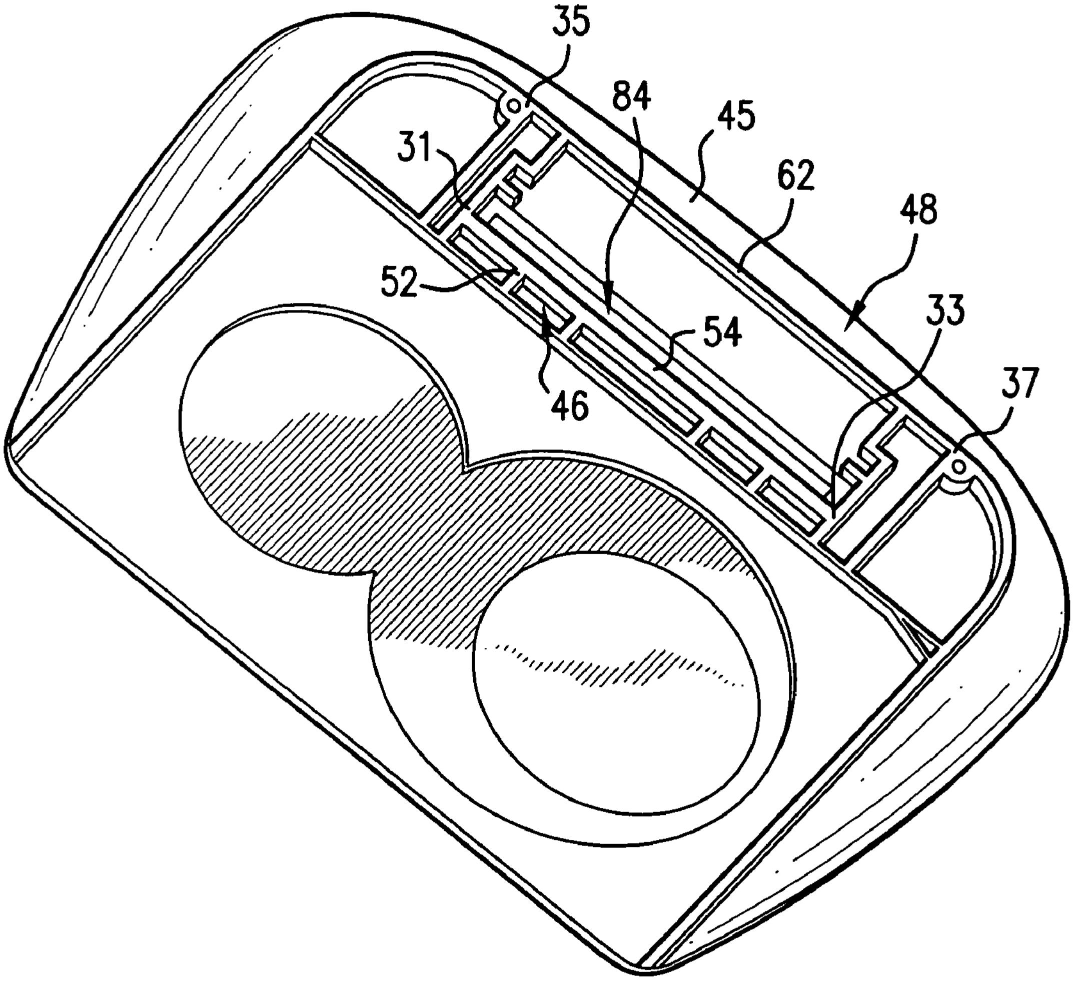
FIG. 3 illustrates a perspective first surface view of an apparatus for transferring at least one label portion from a label assembly onto an object, according to one preferred embodiment of this invention.
Figure 4:
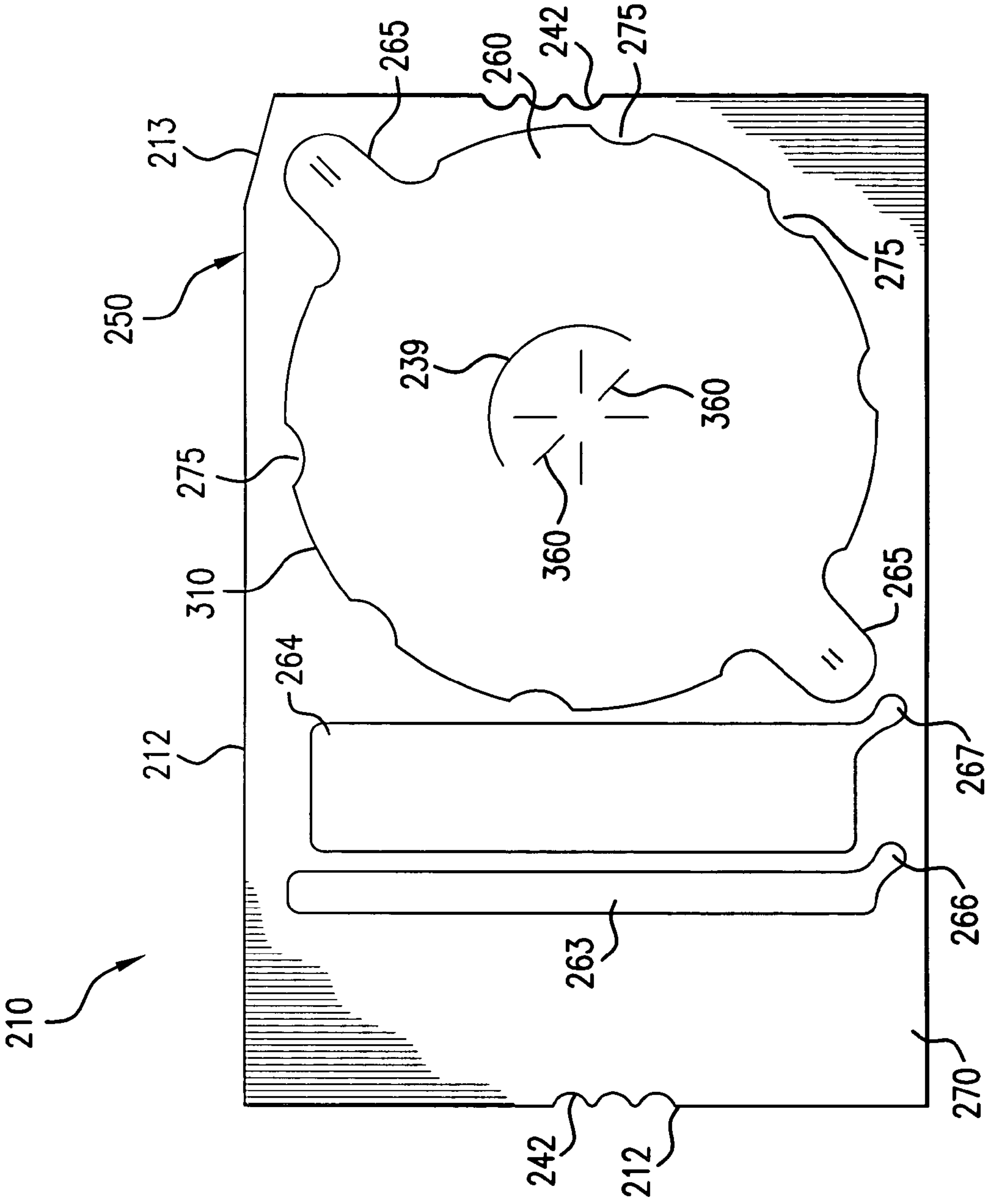
FIG. 4 illustrates a back sheet side view of a label assembly, according to one preferred embodiment of this invention.
Figure 5:
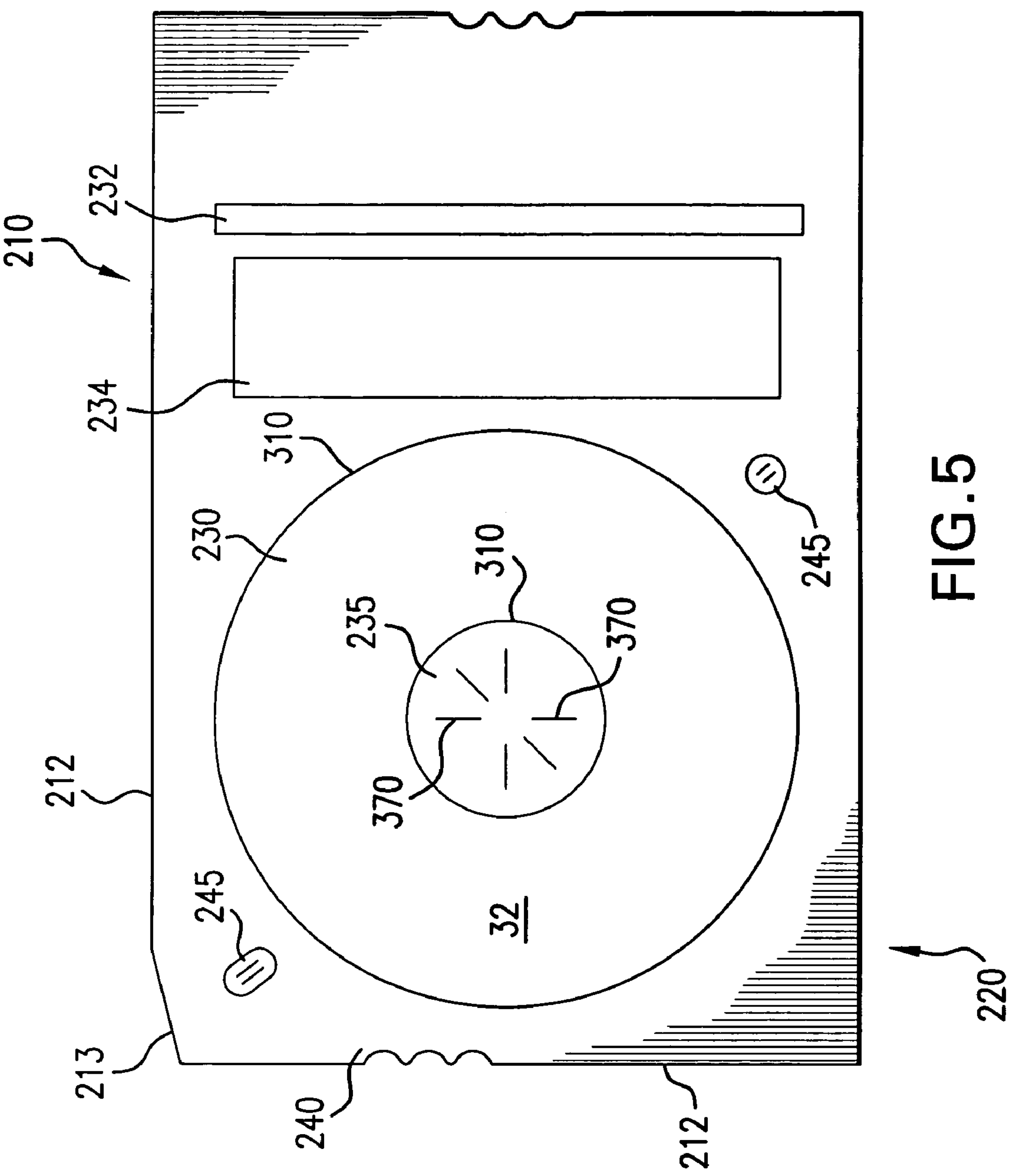
FIG. 5 illustrates a face sheet side view, opposite the view shown in FIG. 4, of the label assembly, according to one preferred embodiment of this invention.
Figure 6:
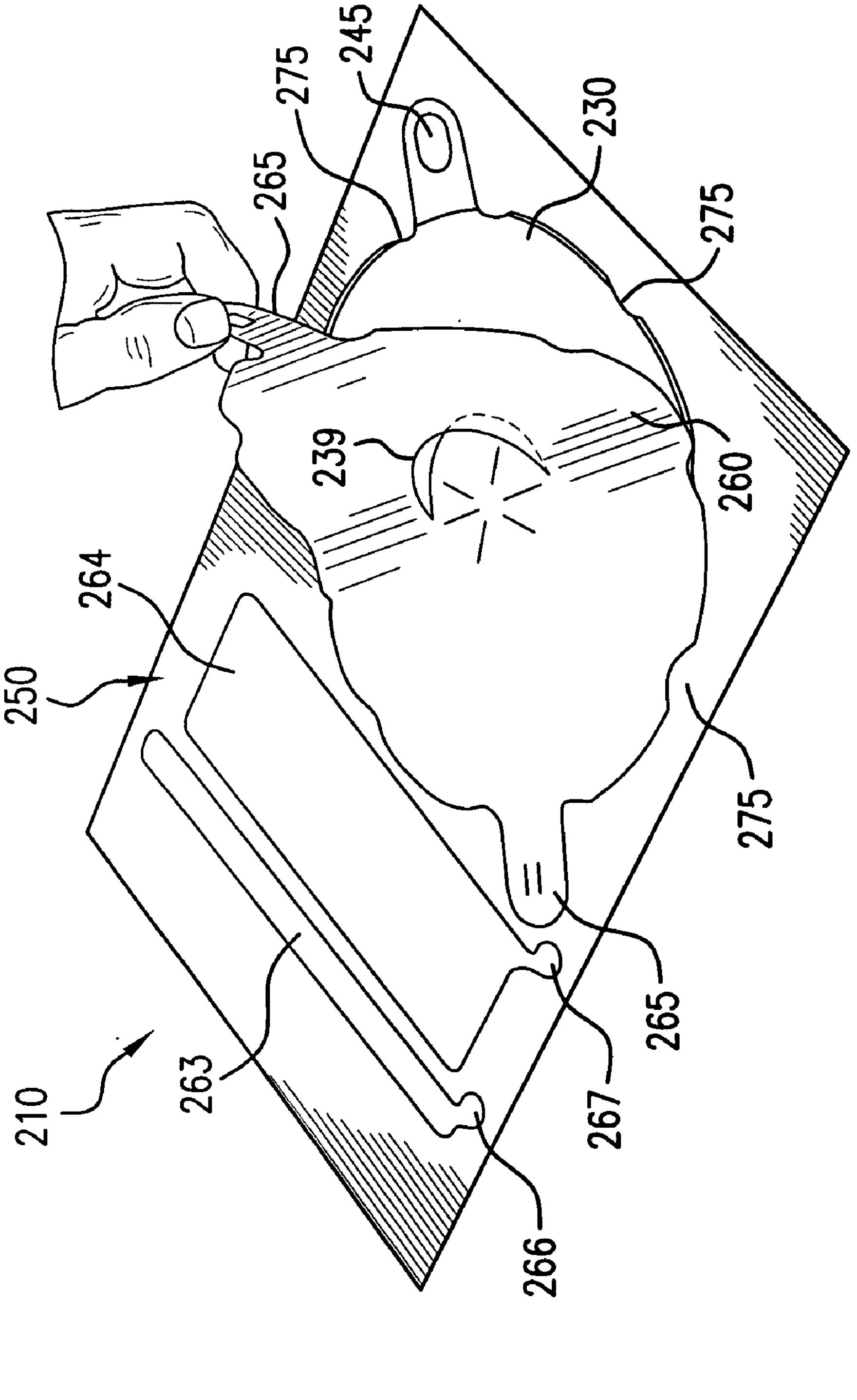
FIG. 6 illustrates a side perspective view of a label assembly as a first portion of a back sheet is removed from a label portion of the label assembly, according to one preferred embodiment of this invention.

FIGS. 1–3 illustrate an apparatus 10 for applying or transferring at least one label portion, such as label portion 230, 232 and/or 234 as shown in FIGS. 4–6, from a label assembly 210 onto an object, according to preferred embodiments of this invention. Apparatus 10, according to various preferred embodiments of this invention, is particularly suitable for applying or transferring a label portion 230, 232 and/or 234 from label assembly 210 to a CD, a DVD or a jewel case. It is not necessary that apparatus 10 shown in FIGS. 1–3 be used with label assembly 210 shown in FIGS. 4–6 and vice versa; however, apparatus 10 and label assembly 210 may include features that are particularly useful when used together.

In one preferred embodiment of this invention, apparatus 10 for transferring at least one label portion 232, 234 from label assembly 210 to an object comprises a base 15. An application area 45 is defined on a first surface of base 15 and a stripping member is connected with respect to application area 45 and suspended over at least a portion of application area 45, wherein at least a portion of label assembly 210 is positionable in a gap formed between the stripping member and the base surface to position the at least one label portion 232, 234 on application area 45.

Referring to FIGS. 1 and 2, apparatus 10 comprises base 15 having a first surface 16 and an opposing second surface 18. Preferably, base 15 is molded or otherwise formed of a suitable plastic material. It should be apparent to those skilled in the art that base 15 may comprise any other suitable material such as metal, wood, a composite material or any strong, durable and generally rigid material known in the art.

In one preferred embodiment of this invention, a wall 20 is connected to base 15. Preferably, but not necessarily, at least a portion of wall 20 is integrated with base 15 and extends along at least a portion of a periphery 19 of base 15. Preferably, wall 20 is sloped along at least a portion of a length of wall 20, for example along periphery 19 so that wall 20 can rest against a surface such as a desktop, and apparatus 10 can be utilized as a mouse pad and/or a working or writing surface.

As shown in FIG. 1, wall 20 preferably but not necessarily forms a first guide 30 and a second guide 32 opposing first guide 30. Each guide 30, 32 corresponds to at least a portion of a periphery 212 of label assembly 210. Wall 20 further forms a stop wall 40 to limit movement and/or properly place label assembly 210 on base 15. In one embodiment of this invention, stop wall 40 includes at least one indexing element 42 to properly index or align label assembly 210 on first surface 16 and within an application area 45 or 110, discussed in detail below. In one preferred embodiment of this invention, stop wall 40 is used in combination with at least one guide 30 and/or 32 to properly position label assembly 210 on first surface 16. Preferably, stop wall 40 extends between a first end portion 31 of first guide 30 and a first end portion 33 of second guide 32. Stop wall 40 may be continuous between first guide 30 and second guide 32 or stop wall 40 may be discontinuous or segmented, comprising one stop wall segment or a plurality of stop wall segments. In one preferred embodiment of this invention, opposing guides 30, 32 converge in a direction towards stop wall 40. Alternatively, base 15 may comprise stop wall 40 having at least one indexing element 42, without guides 30 and/or 32. As shown in FIG. 1 for example, indexing element 42 may comprise any suitable number of projections, notches and/or other profile, design, angle or edge that permits positive engagement between label assembly 210 and apparatus 10. For example, an indexing element 242 formed on label assembly periphery 212 can engage or interfere with indexing element 42 to position label assembly 210 in an indexed position with respect to application area 45 or 110.

Application area 45 is defined on first surface 16 by stop wall 40 and/or opposing guides 30, 32. Preferably, application area 45 corresponds to at least a portion of label assembly periphery 212. A first stripping member 50 is connected or attached with respect to a first end portion 46 of application area 45 and suspended over at least a portion of application area 45. The term "suspended" as used throughout this specification and in the claims refers to an element or member that is fixedly positioned with respect to another element or member to form a gap or space between the fixed element and a surface. For example, first stripping member 50 is fixed with respect to guides 30, 32 and/or stop wall 40 and suspended over at least a portion of application area 45 to form a gap 90 between first stripping member 50 and first surface 16 so that label assembly 210 can be securely positioned within gap 90, as discussed in further detail below. Preferably, a spacing or height of gap 90 between first stripping member 50 and first surface 16 allows frictional contact and/or interference between first stripping member 50 and a portion of label assembly 210 inserted in gap 90 to securely position label assembly 210, and label portions 232, 234, within application area 45, for example.

Preferably, first stripping member 50 comprises at least one stripping finger 52 as shown in FIG. 1, which is formed by or connected to stop wall 40 and extends from stop wall 40 toward application area 45. The at least one stripping finger 52 is preferably suspended over first end portion 46 of application area 45. In one preferred embodiment of this invention, first stripping member 50 comprises a plurality of stripping fingers 52 spaced along stop wall 40 between opposing guides 30, 32, as shown in FIG. 1. Preferably, each stripping finger 52 is integrated with stop wall 40 to form gap 90 between each stripping finger 52 and first surface 16. Additionally or alternatively, first stripping member 50 may comprise a stripping bar 54 as shown in FIG. 3, which is connected to and extends between opposing guide members 30, 32 and is suspended with respect to first end portion 46 of application area 45. In this embodiment, first stripping bar 54 is preferably integrated with and extends between first guide first end portion 31 and second guide first end portion 33 to form gap 90 between first stripping bar 54 and first surface 16.

A second stripping member 60 is connected with respect to a second end portion 48 of application area 45, opposing first end portion 46 as shown in FIG. 1 for example. Second stripping member 60 is suspended over at least a portion of application area 45. In one embodiment of this invention, second stripping member 60 comprises a continuous stripping bar 62, which extends between opposing guides 30, 32 and is suspended with respect to second end portion 48 of application area 45, as shown in FIG. 3. In this embodiment, second stripping bar 62 is preferably integrated with and extends between a second end portion 35 of first guide 30 and a second end portion 37 of second guide 32 to form a gap 90 between second stripping bar 62 and first surface 16. In an alternate embodiment of this invention, second stripping member 60 is directly connected to or integrated with base 15 and suspended with respect to second end portion 48 preferably adjacent or in close proximity to guides 30 and 32.

Referring to FIG. 1, in one preferred embodiment of this invention, one second stripping member 60 is connected between second end portion 35 of first guide 30 and stop wall 40. Second stripping member 60 extends toward application area 45 and is suspended over at least a portion of application area 45. Gap 90 is formed between second stripping member 60 and first surface 16. An opposing second stripping member 60' is connected between second end portion 37 of second guide 32 and stop wall 40. Opposing second stripping member 60' extends toward application area 45 and is suspended over at least a portion of application area 45. Gap 90 is formed between second stripping member 60' and first surface 16. Preferably, a spacing or height of gap 90 between each second stripping member 60, 60' and first surface 16 allows frictional contact and/or interference between second stripping member 60, 60' and a portion of label assembly 210 inserted in gap 90 to securely position label assembly 210, and label portions 232, 234, within application area 45.

Preferably, each second stripping member 60, 60' comprises a secondary guide 70 connected with respect to stop wall 40. Each secondary guide 70 forms a portion of a first object profile 71 and preferably a portion of a second object profile 72 to a provide guidance for aligning and positioning a portion of an object, such as a jewel case spine, within apparatus 10 for applying and transferring label portion 232 and/or 234 from label assembly 210 onto the object at a desired location on the object. For example, a first guide area 84 is defined by second stripping member 60, opposing second stripping member 60' and first stripping member 50, preferably comprising a plurality of stripping fingers 52. First guide area 84 corresponds to a perimeter or periphery of a portion of an object, such as a slim jewel case spine portion, and provides a guide for aligning the spine portion with label portion 232, such as a slim jewel case spine label, on label assembly 210 for transferring label portion 232 from label assembly 210 onto the jewel case spine portion. Preferably but not necessarily, first guide area 84 comprises a recessed area 85 formed in base 15, for example within first surface 16, and within application area 45, which corresponds to label portion 232.

Additionally, a second guide area 86 is defined or bounded by opposing secondary guides 70. Preferably, but not necessarily, second guide area 86 is different than first guide area 84 to correspond to a perimeter or a periphery of a portion of an object, such as a standard jewel case spine portion, and provide a guide for aligning and positioning the portion of the object with label portion 234, such as a standard jewel case spine label, on label assembly 210 and transferring label portion 234 from label assembly 210 onto the object. For example, second guide area 86 is formed or defined by second stripping member 60 and opposing second stripping member 60'. Second guide area 86 can be the same or different than first guide area 84.

Thus, label assembly 210 is positionable on first surface 16 so that at least one label portion 232, 234 is positioned between first stripping member 50 and second stripping member 60. First stripping member 50 and second stripping member 60 securely hold label assembly 210 on first surface 16 while an object is positioned on apparatus 10 and with respect to label portion 232, 234 and inserted into one of first guide area 84 and second guide area 86 to apply and transfer one label portion 232, 234 from label assembly 210 onto the object.

In one preferred embodiment of this invention, apparatus 10 comprises a third guide 100 formed by at least a portion of wall 20, as shown in FIG. 1. Preferably, third guide 100 is integrated with or molded into base 15 and corresponds to at least a portion of label assembly periphery 212 to define a second application area 110 on first surface 16. Preferably, at least one alignment member 112 is connected to or integrated with third guide 100. Alignment member 112 may comprise any suitable number of projections, notches and/or other profile, design, angle or edge that permits positive engagement between label assembly 210 and apparatus 10. Preferably, label assembly 210 includes a corresponding alignment member 213 that engages or interferes with alignment member 112.

A first recessed area 120 is formed in first surface 16 and within second application area 110 for receiving an object, such as a DVD or CD for applying and transferring a label portion, such as label portion 230, onto a surface of the object. A second recessed area 125 is formed in first surface 16 and within second application area 110. In one preferred embodiment of this invention, first recessed area 120 is different than second recessed area 125. Preferably, second recessed area 125 has different dimensions, such as a different diameter, than the dimensions of first recessed area 120, for receiving an object for applying and transferring a label portion to a surface of the object. It should be apparent to those skilled in the art that first recessed area 120 and second recessed area 125 can have any suitable shape, such as a circular, a rectangular, a triangular or any suitable geometric shape, having any suitable dimensions. In order to conserve space on first surface 16 and/or provide a plurality of recessed areas having different dimensions, a portion of first recessed area 120 can overlap a portion of second recessed area 125. Further, a depth of first recessed area 120 can be different than a depth of second recessed area 125 to provide for receiving objects having different thicknesses.

As shown in FIG. 1, a third recessed area 130 can be positioned within first recessed area 120 and/or second recessed area 125.

In one preferred embodiment of this invention, a cover 135 (not shown) is attached or connected with respect to second surface 18 of base 15. Preferably, at least a portion of cover 135 comprises a transparent sheet of plastic or film material to provide a protective covering to place flat objects, such as photographs and/or pictures, between second base surface 18 and cover 135. For example, a first end portion of cover 135 can be attached to a top end portion of second base surface 18 and a second end portion of cover 135 can be attached to a bottom end portion of second base surface 18. Alternatively, cover 135 can be attached or connected to first surface 16 and folded or bent over periphery 19 and positioned with respect to second base surface 18. Cover 135 can be attached or connected with respect to second surface 18 using any suitable connection, including any suitable mechanical and/or adhesive connection known to those skilled in the art.

Referring generally to FIGS. 4–6, label assembly 210 is of any suitable shape, and generally any suitable size that can be accepted by and fed through a printer, such as a laser printer or an inkjet printer. Common sizes of paper generally fed through printers are 8.5 inches by 5.5 inches, 8.5 inches by 11 inches, 8.263 inches by 11.688 inches (A4 size), and 8.5 inches by 14 inches. Label assembly 210 preferably comprises face sheet 220 and back sheet 250 with a layer of adhesive between. Suitable label assemblies are disclosed in copending, commonly-owned U.S. patent application Ser. No. 10/243,481 having a filing date of 25 Apr. 2003, the disclosure of which is incorporated herein by reference.

Face sheet 220 is preferably but not necessarily constructed of any suitable paper, paper composite, non-metal and/or metal material that can be used as a label. Other suitable materials for constructing face sheet 220 include fabric, plastic, and metal foils. An adhesive coating is applied, in any suitable manner known to those skilled in the art, to one side of face sheet 220. Face sheet 220 preferably has a printable surface on a side opposite the adhesive side. The printable surface on face sheet 220 can be any of a variety of face materials used to make pressure sensitive, or self-adhesive labels. Such face materials may include, but are not limited to, smudgeproof stock, litho stock, cast coated stock, tag stock, fluorescent stock, foils, computer printable polyester, vinyl, satin cloth, Tyvek™ material, flexible plastic, book papers, photo quality papers and/or photo quality film. Further, various portions of the face materials can be different colors, thereby resulting in different colored parts, such as first portion 260 and/or label portion 230, as described in more detail below.

Label assembly 210 of the present invention is suitable for a wide number of uses. Prior to assembling, label assembly 210 can be fed into and run through a printer for labeling and/or decorating any portion. Label assembly 210 therefore includes at least one printable side for accepting printing, such as descriptive and/or decorative material.

Label assembly 210 includes face sheet 220 having label portion 230 removable with respect to carrier portion 240 of face sheet 220. Label portion 230 is preferably pre-cut or shaped into a desired form for application in a desired manner, such as a CD or DVD.

Back sheet 250 of label assembly 220 preferably includes first portion 260 that is removable with respect to second portion 270. Back sheet 250 preferably includes one side having a treated surface to facilitate removal of back sheet 250 relative to face sheet 220. Therefore, at least one side of back sheet 250 preferably includes a smooth and/or waxy surface to ease separation from the adhesive side of face sheet 220. The side opposite the treated surface of back sheet 250 may be a printable surface or any other suitable surface.

Referring to FIGS. 4 and 5, first portion 260 of back sheet 250 is preferably generally coextensive with label portion 230 of face sheet 220. Likewise, second portion 270 of back sheet 250 is preferably generally coextensive with carrier portion 240 of face sheet 220.

In one preferred embodiment of this invention, when first portion 260 is removed from label assembly 210, second portion 270 of back sheet 250 is attached to label portion 230 of face sheet 220. Second portion 270 of back sheet 250 may be attached to label portion 230 entirely around a perimeter of label portion 230 or at one or more distinct points of label portion 230. In one preferred embodiment of this invention, back sheet 250 is "attached" to label portion 230 if movement of back sheet 250 results in complementary movement of label portion 230.

As shown in FIG. 5, label portion 230 may be circular, for instance to facilitate application to a CD. First portion 260 is preferably correspondingly circular. Similarly, FIG. 6 shows circular label portion 230 and first portion 260 that is generally circular and generally coextensive with label portion 230 including two or more areas of overlap from back sheet 250 to label portion 230. The areas of overlap may comprise two or more retainers 275 extending from second portion 270 and adhering to label portion 230, as shown in FIGS. 4 and 6.

In one preferred embodiment of this invention, label assembly 210 further includes at least one index tab 265 extending from a periphery of first portion 260. Index tab 265 may be positioned on two sides of first portion 260 such as shown in FIG. 4. Index tab 265 is preferably shaped in such a manner so as to facilitate peeling away of first portion 260.

In one preferred embodiment of this invention, particularly for use with labels for CDs and DVDs, center hole 235 is preferably positioned in a center area of label portion 230. In addition, at least one index hole 245 may be positioned within carrier portion 240. Index hole 245, as shown in FIGS. 5 and 6, may be positioned directly underneath index tab 265 or in any other appropriate position on label assembly 210 including through back sheet 250 and/or face sheet 220.

In one preferred embodiment of this invention, when first portion 260 is peeled away or otherwise removed from label portion 230, center hole 235 is opened and/or removed from label portion 230. Likewise, when first portion 260, including index tabs 265 is removed from label portion 230 and/or carrier portion 240, index hole 245 is opened and/or removed from label portion 230 and/or carrier portion 240.

Center hole 235, index hole 245 and/or any other cutout segment of face sheet 220 may be separated from a remaining portion of face sheet 220 using an arrangement of cuts such as shown in FIG. 4. As shown, one or more first cuts 360 may extend downwardly into first portion 260 and one or more second cuts 370 may extend upwardly into label portion 230 resulting in one or more alternating cuts extending in each direction through label assembly 210. As a result, first cut 360 and second cut 370 join a segment, section and/or cutout of label portion 230 and/or carrier portion 240 to the treated (removable) side of first portion 260.

Alternatively, or in addition, and as shown in FIGS. 4 and 6, center hole 235 may be opened upon removal of first portion 260 using die cut 239 extending partially along a perimeter of center hole 235 through both face sheet 220 and back sheet 250. Die cut 239 is preferably generally arcuate and positioned along a side of center hole 235 that corresponds with a side of first portion 260 that is removed first, as particularly shown in FIG. 6. An arc of die cut 239 preferably extends between approximately 1° and 180° along center hole 235 and more preferably extends between approximately 5° and 90° along center hole 235. Alternatively, or in addition, center hole 235 may be opened upon removal of first portion 260 using an offset center hole 235 relative to a corresponding die cut 239 in first portion 260 alone.

As described above, first portion 260 is separable from label assembly 210 across one or more lines of separation 310 that are positioned in back sheet 250 and each extend from a boundary line between first portion 260 and second portion 270 and inward into back sheet 250. As a result of lines of separation 310, first portion 260 is separable from second portion 270. In certain instances, lines of separation 310 may result in some adherence between adjacent first portion 260 and second portion 270 because of interference between edges in addition to slight seepage of adhesive within lines of separation 310.

According to one preferred embodiment of this invention, label assembly 210 is used for a CD or DVD and includes face sheet 220 having a circular label portion 230 that is applied to the CD and removable with respect to carrier portion 240 of face sheet 220. Back sheet 250 includes a generally circular first portion 260 removable with respect to second portion 270 of back sheet 250. Because first portion 260 of back sheet 250 preferably includes a smaller surface area than label portion 230 of face sheet 220, label portion 230 is retained by second portion 270 of back sheet 250. Further, because the adhesive layer of label portion 230 is exposed, label assembly 210 can be placed on a CD surface thereby applying or affixing label portion 230 onto the CD surface.

Because of the arrangement of label assembly 210 and apparatus 10, label portion 230 may be perfectly round to correspond with the diameters of a CD or may be decorative, such as including a fanciful flower or buzzsaw outline for unique applications. The shape of label portion 230 is not limited by the manner in which it is applied according to this invention because label portion 230 remains attached to carrier portion 240 until the object is applied and therefore is not subject to bending, curling, wrinkles and/or other imperfections which a fanciful outline may otherwise include. In other words, when a traditional label is removed from a back sheet and then applied to another object, the traditional label curls as it is removed and then tends to wrinkle or bend as it is applied. In contrast, label assembly 210 according to this invention, maintains label portion 230 in a flat and fixed position, as label portion 230 contacts the object to be labeled.

In one preferred embodiment of this invention, label assembly 210 may include at least one additional label portion, such as additional label portion 263 and/or 264, removable from back sheet 250 for use elsewhere in the particular application, for instance, for placement on a jewel case of the CD. Label assembly 210 is preferably positioned on base 15, particularly within or between opposing guides 30, 32. As a result, label portions 232, 234 of label assembly 210 are positioned so that the adhesive side of label portions 232, 234 face upward from base 15 and exposed. An object, such as CD jewel case 420, is positioned on label portion 232, 234. Pressure is applied to the object to apply or adhere label portion 232, 234 onto the object in a desired manner.

The object is removed from apparatus 10 to transfer label portion 232, 234 from label assembly 210 onto the object.

In operation, and as described above, carrier portion 240 remains on apparatus 10 following application and transfer of label portion 232 and/or 234 onto the jewel case or other labeled object. Accordingly, label portion 232 and/or 234 is separated from the remaining label assembly 210, leaving carrier portion 240 in position on apparatus 10. As a result, a second labeling operation may be used to transfer one or more additional label portions onto an object using the same label assembly 210, such as described in more detail below.

In one preferred embodiment of this invention, label portion 230 can be used as a label for a CD. More particularly, the label portion 230 is die-cut, perforated, microperforated, or otherwise cut to form tearable lines of separation 310, which can be used to remove label portion 230 in any suitable shape, such as a circle, preferably of a slightly smaller surface area than a surface area of the CD.

A method for labeling a CD according to one preferred embodiment of this invention uses label assembly 210 with back sheet 250 and face sheet 220, wherein face sheet 220 includes an adhesive side and a printable side. The user positions the CD in the appropriate recessed area 120, 125 or 130. Referring to FIG. 6, first portion 260 of back sheet 250 is removed by the user from face sheet 220 to expose the adhesive side of label portion 230. Label assembly 210 is then placed into an indexed position with respect to apparatus 10 and a surface of the CD. Preferably, label assembly 210 is positioned within second application area 110, so that at least a portion of the periphery of label assembly 210 is positioned with respect to second guide 100. The adhesive side of indexed label portion 230 is then positioned to contact the surface of the CD resulting in label portion 230 adhering onto the CD surface in an aligned manner free of creases, bubbles or other irregularities.

In addition, at least one additional label portion may be indexed on apparatus 10 for placement elsewhere, such as a CD jewel case. An additional portion 263 and/or 264 of back sheet 250 may be removed from face sheet 220 to expose second label portion 232 and/or 234 of face sheet 220. Label portion 232 and/or 234 may be, for example, a slim or standard spine label for a spine of the CD jewel case. Like label portion 230 described above, label portions 232, 234 are drawn from label assembly 210 having back sheet 250 and a face sheet 220, wherein additional portion 263, 264 of back sheet 250 are removable from face sheet 220 to expose label portion 232, 234, respectively. Additional portion 263, 264 preferably includes a greater surface area than label portion 232, 234. At least one pull tab 266, 267 may extend from a periphery of additional portion 263, 264 to facilitate removal, both visually and physically.

In one preferred embodiment of this invention, base 15 includes guide areas 84 and/or 86 that correspond with a size and placement of label portion 232 and/or 234. As a result, an object may be positioned within one of first guide area 84 and second guide area 86 to transfer label portion 232 or 234 of face sheet 220 onto the object. For example, the user preferably but not necessarily first removes second portion 263 and/or 264 of back sheet 250 from face sheet 220. As a result, label portion 232 and/or 234 of face sheet 220 is exposed so that the adhesive side faces upwards. Label assembly 210 is then placed in an indexed position on apparatus 10 with the adhesive layer facing upwards. In one preferred embodiment of this invention, label assembly 210 is securely positioned within first application area 45 by sliding label assembly 210 through gap 90 formed between second stripping member 60 and surface 16 and first stripping member 50 and surface 16, so that label portion 232 is positioned with respect to first guide area 84 and label portion 234 is positioned with respect to second guide area 86. Each label portion 232, 234 is positioned between first stripping member 50 and second stripping member 60. In one preferred embodiment of this invention, an end portion of label assembly 210 is securely positioned within a gap 90 formed between each stripping finger 52, positioned with respect to first end portion 46 of application area 45, and first surface 16. Portion 263 and/or 264 of back sheet 250 can be removed from face sheet 220 to expose label portion 232 and/or 234 before or after label assembly 210 is positioned between first stripping member 50 and second stripping member 60. The user inserts or positions a spine edge of the CD jewel case within first guide area 84 or second guide area 86 to transfer label portion 232 or 234 onto the CD jewel case.

In one preferred embodiment of this invention, a method for transferring at least one label portion 232, 234 from label assembly 210 to an object, such as a CD jewel case, includes the step of sliding at least a portion of label assembly 210 through gap 90 formed between second stripping member 60 and first surface 16. For example, referring to FIG. 1, label assembly 210 can slide underneath each second stripping member 60, 60', which extend from respective guides 30, 32 and are suspended with respect to second end portion 48 of application area 45. Preferably, each second stripping member 60, 60' is suspended at a suitable height with respect to first surface 16 to provide a suitable frictional interference with label assembly 210 to securely position label assembly 210 with respect to application area 45. In one preferred embodiment of this invention, each second stripping member 60, 60' further comprises secondary guide 70 that preferably extends to stop wall 40 to form at least one object profile and further securely position label assembly 210 with respect to application area 45.

At least a portion of label assembly 210 is slid through gap 90 formed between first stripping member 50 and first surface 16. For example, in one preferred embodiment of this invention, first stripping member 50 comprises a plurality of stripping fingers 52 spaced along and extending from stop wall 40. Each stripping finger 52 is suspended with respect to first end portion 46 of application area 45 to allow an end portion of label assembly 210 to slide underneath each stripping finger 52. Preferably, each stripping finger 52 is suspended at a suitable height with respect to first surface 16 to provide a suitable frictional interference with label assembly 210 to securely position label assembly 210 with respect to application area 45.

Stop wall 40 preferably includes at least one indexing element 42, as shown in FIG. 1, which mateably engages or interferes with a corresponding at least one indexing element 242 on label assembly 210, as shown in FIG. 4. Indexing element 242 may comprises any suitable number of projections, notches and/or other profile, angle or edge that permits positive engagement between label assembly 210 and apparatus 10. Indexing element 242 is preferably the same or similar to indexing element 42 to allow label assembly 210, and label portions 232, 234, to be properly indexed on apparatus 10 with respect to application area 45. With label assembly 210 properly indexed with respect to application area 45, at least one label portion 232, 234 is securely positioned between first stripping member 50 and second stripping member 60 and within application area 45 defined on first surface 16, with the adhesive side of label portion 232, 234 exposed.

The adhesive side of label portion 232, 234 can be exposed before or after label assembly 210, and label portions 232 and 234, are securely positioned between first stripping member 50 and second stripping member 60. A portion 263 and/or 264 of back sheet 250 may be removed from face sheet 220 to expose label portion 232 and/or 234 of face sheet 220 so that the adhesive side of label portion 232 and/or 234 faces upwards. Preferably, but not necessarily, pull tab 266, 267 extends from a periphery of the back sheet portion 263, 264, respectively, to facilitate removal of back sheet portion 263, 264.

The object, such as a jewel case spine portion, can then be positioned or inserted within one of first guide area 84 and second guide area 86 defined by base 15 and corresponding to label portion 232 and 234, respectively, to apply and transfer label portion 232 and/or 234 onto the object. In one preferred embodiment of this invention as shown in FIG. 1, first guide area 84 is defined by opposing second stripping members 60, 60' and first stripping member 50 connected with respect to first surface 16. Second guide area is defined by opposing second stripping members 60, 60'. In one preferred embodiment of this invention, secondary guides 70 define at least a portion of first guide area 84 and/or second guide area 86. With the object positioned within first guide area 84, the object is positionable within recessed area 85 formed within first surface 16 and within application area 45. Preferably, recessed area 85 corresponds to label portion 232 or 234. The object contacts label portion 232 or 234 to apply or adhere label portion 232 or 234 onto the object. Preferably, a suitable pressure is applied to the object to apply or adhere label portion 232 or 234 to the object. With label portion 232 or 234 applied or adhered to the object, the object is removed from within first guide area 84 or second guide area 86 and label portion 232 or 234 is separated or removed from label assembly 210. Preferably, carrier portion of label assembly 210 remains on apparatus 10 following transfer of label portion 232 or 234 onto the object and label assembly 210 remains securely positioned within application area 45 so that a second label portion 232 or 234 can be transferred from label assembly 210 onto a second desired location on the object or a second object.

For example, in one preferred embodiment of this invention, label portion 232 and/or 234 comprises a spine label having dimensions which correspond to the dimensions of a spine portion of a jewel case for holding a CD or a DVD. The spine edge of the jewel case is positioned or inserted within one of first guide area 84 and second guide area 86 to apply and transfer label portion 232, 234 onto the jewel case spine.

While in the foregoing specification this invention has been described in relation to certain preferred embodiments thereof, and many details have been set forth for purpose of illustration, it will become apparent to those skilled in the art that the invention is susceptible to additional embodiments and that certain of the details described herein can be varied considerably without departing from the basic principles of the invention. Therefore, to particularly point out and distinctly claim the subject matter regarded as the invention, the following claims conclude the specification.

What is claimed is:

1. An apparatus for transferring at least one label portion from a label assembly onto an object comprising:

a base;

a stop wall connected to the base;

an application area defined on a first surface of the base and bounded at one end by the stop wall;

a first stripping member connected with respect to a first end portion of the application area, the first stripping member having at least one stripping finger extending from the stop wall toward the application area and suspended over at least a portion of the application area; and a second stripping member connected with respect to a second end portion of the application area and suspended over at least a portion of the application area, wherein at least a portion of the label assembly is positionable in a gap formed between the first stripping member and the application area and a gap formed between the second stripping member and the application area to position the at least one label portion on the base surface between the first stripping member and the second stripping member, wherein the label assembly remains on the application area following transfer of the at least one label portion from the label assembly onto the object.

2. The apparatus of claim 1 wherein the stop wall comprises an indexing element.

3. The apparatus of claim 1 further comprising opposing guides positioned with respect to the application area and corresponding to at least a portion of a periphery of the label assembly.

4. The apparatus of claim 3 wherein the first stripping member comprises a stripping bar extending between the opposing guides and suspended with respect to the first end portion of the application area.

5. The apparatus of claim 3 wherein the second stripping member comprises a stripping bar extending between the opposing guides and suspended with respect to the second end portion of the application area.

6. The apparatus of claim 3 wherein the second stripping member comprises a first member extending from an end portion of a first guide of the opposing guides toward the application area and a second member extending from an end portion of a second guide of the opposing guides toward the application area, each member suspended over at least a portion of the application area.

7. The apparatus of claim 6 wherein each member further comprises a secondary guide connected with respect to the stop wall.

8. The apparatus of claim 7 further comprising a first guide area defined by the secondary guides.

9. The apparatus of claim 8 wherein the first guide area comprises a recessed area formed in the base and within the application area, the recessed area corresponding to one label portion of the at least one label portion.

10. The apparatus of claim 8 further comprising a second guide area defined by the secondary guides different than the first guide area.

11. The apparatus of claim 8 wherein each secondary guide forms a portion of a first object profile.

12. The apparatus of claim 11 wherein each secondary guide forms a portion of a second object profile.

13. The apparatus of claim 3 wherein the opposing guides converge towards the stop wall.

14. The apparatus of claim 1 wherein the base comprises one of plastic, metal, wood and composite material.

15. The apparatus of claim 1 wherein at least a portion of the stop wall is integrated with the base.

16. The apparatus of claim 1 wherein a wall extends along at least a portion of a periphery of the base.

17. The apparatus of claim 16 wherein each of the first stripping member and the second stripping member is integrated with the wall.

18. The apparatus of claim 16 wherein the wall is sloped along at least a portion of a length of the wall.

19. The apparatus of claim 1 further comprising a cover attached with respect to a second surface of the base.

20. The apparatus of claim 19 wherein at least a portion of the cover is transparent.

21. An apparatus for transferring a label portion from a label assembly onto an object comprising:

a base;

a wall integrated with the base, at least a portion of the wall forming opposing guides corresponding to at least a portion of a periphery of the label assembly and a stop wall, the opposing guides and the stop wall defining an application area on a surface of the base;

at least one stripping finger extending from the stop wall and suspended over a first end portion of the application area, a gap formed between the at least one stripping finger and the base surface;

a first stripping member extending from a first guide of the opposing guides and suspended over at least a portion of a second end portion of the application area and at a distance from the at least one stripping finger, a gap formed between the first stripping member and the base surface; and a second stripping member extending from a second guide of the opposing guides and suspended over at least a portion of the second end portion of the application area and at a distance from the at least one stripping finger, a gap formed between the second stripping member and the base surface.

22. The apparatus of claim 21 wherein the first stripping member, the second stripping member and the at least one stripping finger define a first guide area.

23. The apparatus of claim 22 wherein the first guide area comprises a recessed area formed in the base and within the application area, the recessed area corresponding to one label portion of the at least one label portion.

24. The apparatus of claim 22 wherein the first stripping member and the second stripping member define a second guide area different than the first guide area.

25. An apparatus for transferring at least one label portion from a label assembly onto an object comprising:

a base forming a wall;

a first guide formed by at least a portion of the wall and corresponding to a portion of a periphery of the label assembly;

a second guide formed by at least a portion of the wall, the second guide opposing the first guide and corresponding to a portion of the periphery of the label assembly;

a stop wall extending between a first end portion of the first guide and a first end portion of the second guide, the stop wall, the first guide and the second guide defining an application area on a surface of the base;

a plurality of stripping fingers extending from the stop wall toward the application area and suspended over at least a portion of the application area, a gap formed between each stripping finger of the plurality of stripping fingers and the base surface;

a first stripping member connected between a second end portion of the first guide and the stop wall, the first stripping member extending toward the application area and suspended over at least a portion of the application area, a gap formed between the first stripping member and the base surface; and a second stripping member connected between a second end portion of the second guide and the stop wall, the second stripping member extending toward the application area and suspended over at least a portion of the application area, a gap formed between the second stripping member and the base surface.

26. The apparatus of claim 25 further comprising:

a first guide area defined by the first stripping member, the second stripping member and the plurality of stripping fingers; and a second guide area defined by the first stripping member and the second stripping member, the second guide area different than the first guide area.

27. The apparatus of claim 26 wherein the first guide area comprises a first recessed area formed in the base and within the application area.

28. The apparatus of claim 26 further comprising a third guide formed by at least a portion of the wall, the third guide corresponding to at least a portion of the periphery of the label assembly and defining a second application area on the base surface.

29. The apparatus of claim 28 further comprising a first recessed area formed in the base surface and within the second application area.

30. The apparatus of claim 29 further comprising a second recessed area formed in the base surface and within the second application area.

31. The apparatus of claim 30 wherein the first recessed area is different than the second recessed area.

32. The apparatus of claim 30 wherein a portion of the first recessed area overlaps a portion of the second recessed area.

33. The apparatus of claim 30 wherein a depth of the first recessed area is different than a depth of the second recessed area.

34. The apparatus of claim 30 wherein a third recessed area is positioned within the first recessed area.

35. The apparatus of claim 28 further comprising at least one alignment member connected to the third guide.

36. An apparatus for transferring at least one label portion from a label assembly onto an object comprising:

a base;

an application area defined on a first surface of the base;

a first guide connected to the base and defining a first side of the application area;

a second guide connected to the base and opposing the first guide, the second guide defining a second side of the application area;

a first stripping member connected to the first guide and suspended over at least a portion of the application area; and a second stripping member connected to the second guide and suspended over at least a portion of the application area, wherein at least a portion of the label assembly is positionable in a gap formed between the first stripping member and the base surface and a gap formed between the second stripping member and the base surface to position the at least one label portion on the application area.

* * * * *